April 9, 1957 A. I. COOKSON ET AL 2,788,187
ELECTRICAL OUTLET BOX SUPPORT
Filed April 15, 1954
2 Sheets-Sheet 1
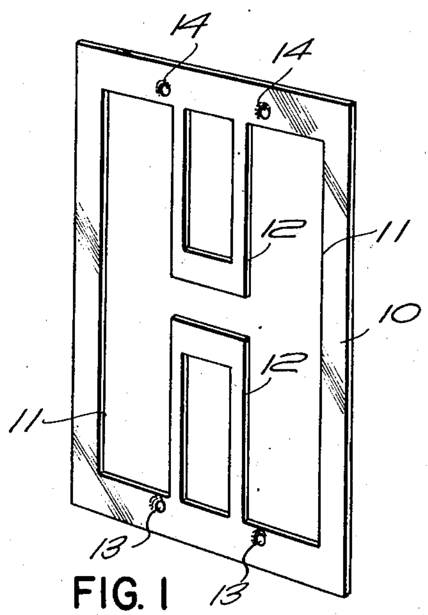
FIG. 1
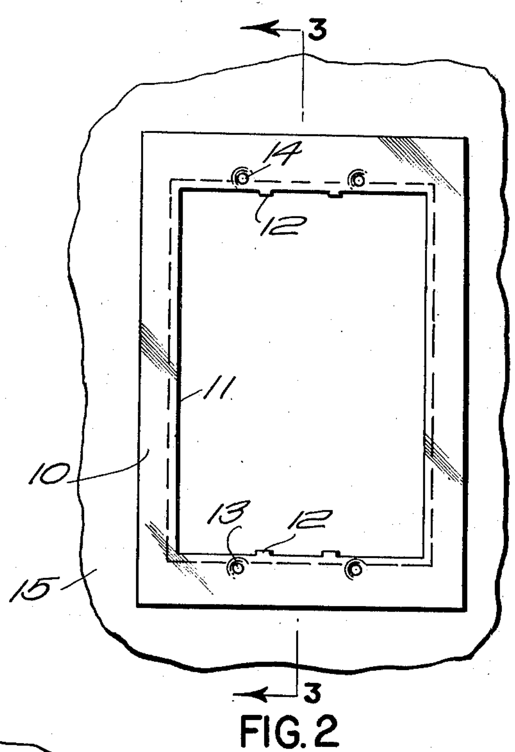
FIG. 2
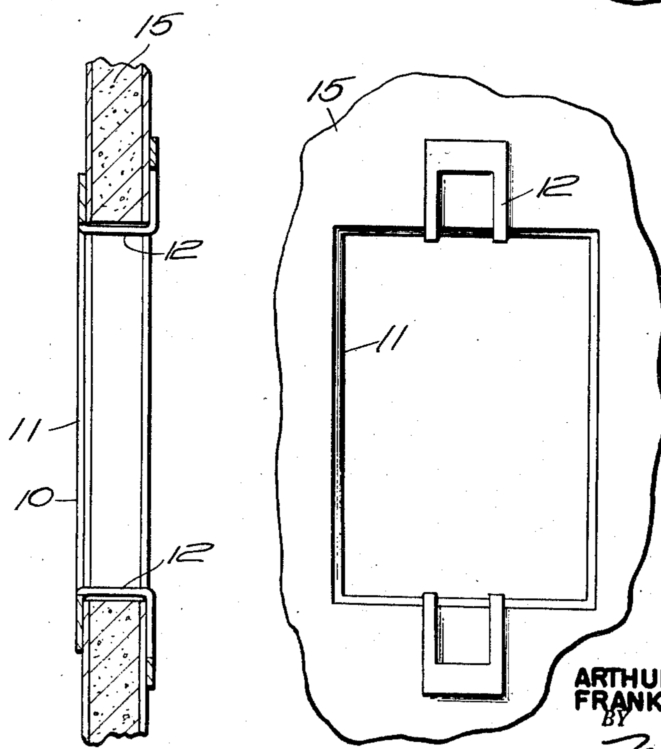
FIG. 3
FIG. 4
INVENTORS
ARTHUR I. COOKSON
FRANK M. DE MONT
BY
Max Schwartz
ATTORNEY April 9, 1957 | A. I. COOKSON ET AL | 2,788,187

ELECTRICAL OUTLET BOX SUPPORT

Filed April 15, 1954 | 2 Sheets-Sheet 2

INVENTORS
ARTHUR I. COOKSON
FRANK M. DEMONT
BY Max Schwartz
ATTORNEY

United States Patent Office 2,788,187

Patented Apr. 9, 1957

2,788,187

ELECTRICAL OUTLET BOX SUPPORT

Arthur I. Cookson, East Providence, R. I., and Frank M. De Mont, Hanson, Mass.; Nita M. Cookson, administratrix of said Arthur I. Cookson, deceased, assignors to Thomas Tool & Die Co., Hanson, Mass., a copartnership consisting of Walter A. Thomas and Stanley W. Thomas Application April 15, 1954, Serial No. 423,458

1 Claim. (Cl. 248—27)

Our present invention relates to an improved electrical outlet box, and more particularly to a supporting frame which permits the attachment to a building wall.

The principal object of the present invention is to provide a supporting plate or frame which will permit rapid and rigid installation of an outlet box in a building wall.

Another object of the present invention is to provide an outlet box support which can be mounted in any type of wall and compensates for varying thicknesses of wall.

A further object of the present invention is to provide a supporting plate which also acts as a template for laying out the opening.

Another object of the present invention is to provide a supporting plate which is easy and economical to manufacture and rapid in assembly.

With the above and other objects and advantageous features in view, our invention consists of a novel arrangement of parts more fully disclosed in the detailed description following, in conjunction with the accompanying drawings, and more particularly defined in the appended claim.

In the drawings:

Fig. 1 is a perspective view of a supporting plate embodying our invention.

Fig. 2 is a rear view of the plate in position in a wall opening.

Fig. 3 is a section taken on line 3—3 on Fig. 2.

Fig. 4 is a front elevation of the wall opening with the plate in position.

Fig. 6 is a section taken on line 6—6 on Fig. 5.

The conventional outlet box comprises a sheet metal box having an open face and a pair of lugs in the plane of the face so that when the box is inserted into a wall opening it can be connected to the wall by screws or nails. These boxes present a problem when the screws enter the wall plaster or the free ends of the lath. There is no firm anchorage and the boxes frequently become loose. Accordingly, the electrician must always look for studs to obtain a firm mounting.

The present invention is designed to overcome these defects by providing a supporting plate or frame which permits rigid mounting at any point in the wall. The box can readily be removed for additional wiring and easily replaced. The plate acts as a template and is fast and simple to install. The device of the present invention actually strengthens the wall opening and can be used on wall thicknesses for example from 1/8" to 1 1/4". It can also be made in larger sizes to handle multiple boxes.

Figure 5:
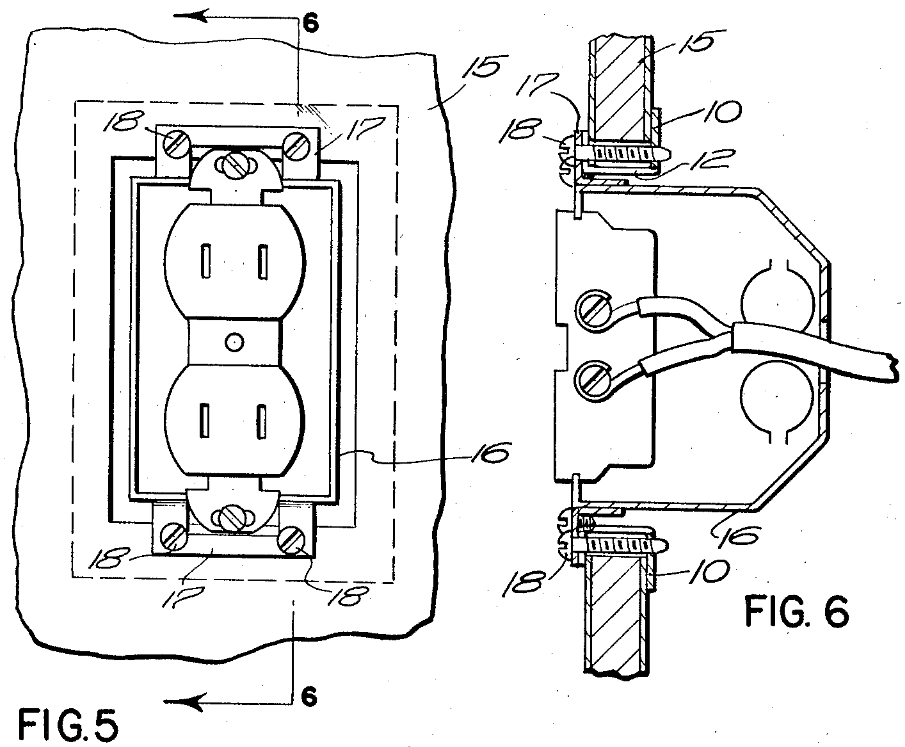
Fig. 5 is a front view of the plate and outlet box fastened to the wall opening.

Referring more in detail to the drawings illustrating our invention, Fig. 1 shows the supporting plate for the outlet box. It comprises a rectangular frame 10 made of flat sheet metal. Since the frame 10 is to be used as a template, the inside dimensions 11 correspond with the size of the opening required for a standard outlet box such as shown in Figs. 5 and 6. The plate 10 is provided with a pair of integral loop portions 12 extending towards each other from the top and bottom. The plate 10 is also provided with a pair of spaced openings 13 adjacent the bottom inside edge and a similar pair of openings 14 adjacent the top inside edge. The openings 13 and 14 are slightly extruded to allow a tapered sheet metal screw to cut through the extruded portions in attaching to the plate.

Now referring to Figs. 2, 3, and 4, the plate 10 is first placed against the wall 15 in the spot where it is desired to place the outlet box. A line is then drawn on the wall using the inside edge 11 as a template. The wall is then cut or sawed out along this line. The tabs 12 are then bent sharply at right angles to the plane of the plate and used as handles for inserting the plate into the opening into the position shown in Fig. 2. The excess portion of the tabs protruding through the front of the opening are then bent over against the wall as shown in Figs. 3 and 4. This firmly locks the plate 10 against the back of the wall opening.

Referring to Figs. 5 and 6, the conventional outlet box 16 is provided at the top and bottom with lugs 17 normally adapted to overlie the top and bottom edges of the opening. After the electrical connections are made the box 16 is slipped into the opening. In this position it will be found that the lugs 17 are provided with screw openings in alignment with the openings 13 and 14 of the plate 10. Tapered sheet metal screws 18 are then screwed through the lug openings, through the wall and into the openings 13 and 14 of the plate 10. If desired the wall opening may be slotted to accommodate these screws and insure easier assembly. As the screws 18 are tightened the lugs 17 are pressed against the upper and lower edges of the wall opening and the plate 10 is pulled against the rear edge of the wall opening providing a tight fit which firmly clamps the outlet box in position without damaging the wall. Since the plate is first anchored to the wall it will remain in position even if the outlet box is removed for rewiring or replacement.

In order to allow for different thicknesses of walls up to 1 1/4", the tabs 12 are made approximately 1 1/2" long and the screws 18 are approximately 1 1/2" long. If the wall is thin so that a large portion of the tab extends in front as shown in Fig. 4 a good deal of it will be covered over by the lugs 17. The remainder of the tab is bent out and broken off. This results in a neat finished appearance shown in Fig. 5 with no excess metal protruding. A final cover plate can then be positioned over the outlet in the usual manner.

Figure 7:
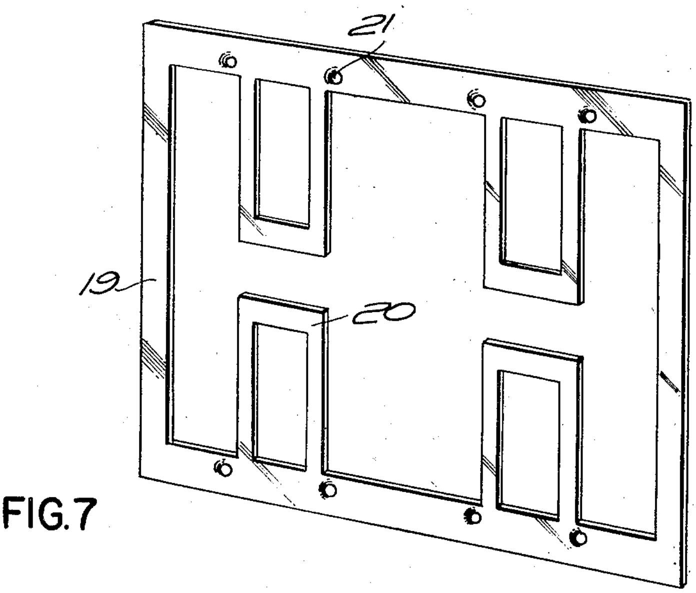
Fig. 7 is a perspective view of a multiple form of plate shown in Fig. 1.

If a multiple outlet is to be used the frame 10 can be made sufficiently large and additional tabs can be added. For example in Fig. 7 the plate 19 is of double size and is provided with four tabs 20 and eight openings 21. Similarly the plate can be made in triple, quadruple, or even larger sizes.

The use of the plate 10 thus permits the mounting of the outlet box anywhere in the wall without regard to studs and the thickness of the wall plaster. The plate acts as a template and the installation is fast and extremely rigid. Since the plate is held in position by the tabs no difficulty is encountered in aligning the screw holes and thus automatically centering the box in the opening.

In the form illustrated the screws are positioned at the point of greatest strain thus greatly strengthening the insallation and preventing twisting of the box or cracking of the wall. While the illustrated form shows a rectangular plate having tabs at the top and bottom, it is obvious that the plate can be altered to fit different shapes of boxes, i. e. round, hexagonal, etc., and that the tabs can be placed at the sides or in other positions within the scope of our invention.

Other advantages of the present invention will be readily apparent to a person skilled in the art.

We claim:

An assembly mounted in a wall having a recess therein, said assembly including an electrical outlet box in said recess, said box being provided with lugs at opposite upper and lower edges having holes therethrough opposite said wall, said lugs overlapping the front face of said wall, an outlet box supporting plate comprising a flat, rectangular frame having a central opening therein and embodying a tab portion extending from the upper, and a tab portion extending from the lower, inner edge portions thereof, said frame having holes in the upper and lower edges thereof laterally beyond said respective tab portions, said frame being positioned at the inner face of said wall, and said upper and lower tab portions being bent forwardly of said frame above and below the top and the bottom edges thereof respectively and over and in contact with the front face of said wall and under said lug, and screws extending through said holes in said lugs, wall and holes in said frame.

References Cited in the file of this patent

UNITED STATES PATENTS

| | | |
|---|---|---|
| 1,113,092 | Beugler | Oct. 6, 1914 |
| 1,490,252 | Bissell | Apr. 15, 1924 |
| 1,567,863 | Sargent et al. | Dec. 29, 1925 |
| 1,791,311 | Hamblen | Feb. 3, 1931 |
| 2,334,799 | Thompson | Nov. 23, 1943 |
| 2,518,912 | Lampe | Aug. 15, 1950 |
| 2,562,344 | Tranas | July 31, 1951 |